United States Patent
Thai et al.

(10) Patent No.: US 12,005,580 B2
(45) Date of Patent: Jun. 11, 2024

(54) METHOD AND DEVICE FOR CONTROLLING A ROBOT

(71) Applicant: Robert Bosch GmbH, Stuttgart (DE)

(72) Inventors: Hong Linh Thai, Gerlingen (DE); Jan Peters, Seeheim-Jugenheim (DE); Michael Herman, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 359 days.

(21) Appl. No.: 17/436,020

(22) PCT Filed: Mar. 5, 2020

(86) PCT No.: PCT/EP2020/055900
§ 371 (c)(1),
(2) Date: Sep. 2, 2021

(87) PCT Pub. No.: WO2020/187591
PCT Pub. Date: Sep. 24, 2020

(65) Prior Publication Data
US 2022/0176554 A1    Jun. 9, 2022

(30) Foreign Application Priority Data
Mar. 18, 2019 (DE) .......................... 102019203634.1

(51) Int. Cl.
*B25J 9/16* (2006.01)
*G05B 13/02* (2006.01)

(52) U.S. Cl.
CPC ............ *B25J 9/163* (2013.01); *G05B 13/027* (2013.01)

(58) Field of Classification Search
CPC .............................. B25J 9/163; G05B 13/027
See application file for complete search history.

(56) References Cited

U.S. PATENT DOCUMENTS

| 10,936,946 | B2* | 3/2021 | Mnih | G06N 3/045 |
|---|---|---|---|---|
| 2018/0330200 | A1* | 11/2018 | Shibata | G06F 18/241 |
| 2020/0062262 | A1* | 2/2020 | Kusari | G06N 3/08 |
| 2020/0150671 | A1* | 5/2020 | Fan | G05D 1/0221 |
| 2021/0049415 | A1* | 2/2021 | Whiteson | G06V 10/774 |
| 2021/0271968 | A1* | 9/2021 | Ganin | G06N 3/08 |

OTHER PUBLICATIONS

International Search Report for PCT/EP2020/055900, Issued Jun. 29, 2020.

(Continued)

*Primary Examiner* — Jaime Figueroa
*Assistant Examiner* — Mohamad O El Sayah
(74) *Attorney, Agent, or Firm* — NORTON ROSE FULBRIGHT US LLP; Gerard A. Messina

(57) ABSTRACT

A computer-implemented method for applying control to a robot, and apparatus therefor. A parametric model of an environment, in particular a deep neural network, is trained in accordance with a method for training the parametric model of the environment. The model is trained depending on a controlled system. A strategy is learned in accordance with a method for model-based learning of the strategy. Control is applied to the robot depending on the parametric model and on the strategy.

10 Claims, 3 Drawing Sheets

(56) References Cited

OTHER PUBLICATIONS

Ho et al., "Generative Adversarial Imitation Learning," 30th Conference on Neural Information Processing Systems (NIPS 2016) 2016, pp. 1-9. <https://papers.nips.cc/paper/2016/file/cc7e2b878868cbae992d1fb743995d8f-Paper.pdf> Downloaded Sep. 1, 2021.

Doerr et al., "Optimizing Long-Term Predictions for Model-Based Policy Search," 1st Conference on Robot Learning, 2017, pp. 1-12. <http://proceedings.mlr.press/v78/doerr17a/doerr17a.pdf> Downloaded Sep. 1, 2021.

Azizzadenesheli et al., "Sample-Efficient Deep RL With Generative Adversarial Tree Search," Prediction and Generative Modeling in Reinforcement Learning, 2018, pp. 1-10. <http://reinforcement-learning.ml/papers/pgmrl2018_azizzadenesheli.pdf> Downloaded Sep. 1, 2021.

Xiao et al., "Generative Adversarial Networks for Model Based Reinforcement Learning With Tree Search," 2016, pp. 1-10. <http://tedxiao.me/pdf/gans_drl.pdf> Downloaded Sep. 1, 2021.

Chen et al., "Generative Adversarial User Model for Reinforcement Learning Based Recommendation System," Proceedings of the 36th International Conference on Machine Learning, Long Beach, California, PMLR 97, 2019, pp. 1-10. <http://proceedings.mlr.press/v97/chen19f/chen19f.pdf> Downloaded Sep. 1, 2021.

Baram et al., "End-To-End Differentiable Adversarial Imitation Learning," Proceedings of the 34th International Conference on Machine Learning, Sydney, Australia, PMLR 70, 2017, pp. 1-10. <https://proceedings.mlr.press/v70/baram17a/baram17a.pdf> Downloaded Sep. 1, 2021.

Saxena et al., "DYNA-AIL: Adversarial Imitation Learning By Planning," Cornell University Library, 2019, pp. 1-8. <https://arxiv.org/pdf/1903.03234.pdf> Downloaded Sep. 1, 2021.

Huang et al., "Enhanced Experience Replay Generation for Efficient Reinforcement Learning," Cornell University Library, 2017, pp. 1-7. <https://arxiv.org/pdf/1705.08245.pdf> Downloaded Sep. 1, 2021.

Herman et al., "Simultaneous Estimation of Rewards and Dynamics From Noisy Expert Demonstrations," ESANN 2016 Proceedings, European Symposium on Artificial Neural Networks, Computational Intelligence and Machine Learning, Bruges (Belgium), 2016, pp. 677-682. <https://www.esann.org/sites/default/files/proceedings/legacy/es2016-114.pdf> Downloaded Sep. 1, 2021.

* cited by examiner

METHOD AND DEVICE FOR CONTROLLING A ROBOT

BACKGROUND INFORMATION

J. Ho and S. Ermon: "Generative adversarial imitation learning", in D. D. Lee, M. Sugiyama, U. V. Luxburg, I. Guyon, and R. Garnett, editors, Advances in Neural Information Processing Systems 29, pp. 4565-4573. Curran Associates, Inc., 2016, describe aspects of generative adversarial imitation learning (GAIL). GAIL is a method for training a strategy that is intended to imitate expert behavior.

A. Doerr, C. Daniel, D. Nguyen-Tuong, A. Marco, S. Schaal, T. Marc, and S. Trimpe: "Optimizing long-term predictions for model-based policy search", in S. Levine, V. Vanhoucke, and K. Goldberg, editors, Proceedings of the 1st Annual Conference on Robot Learning, Volume 78 of Proceedings of Machine Learning Research, pages 227-238. PMLR, 13-15 Nov. 2017, describe aspects of long-term predictions for model-based learning of such strategies.

Kamyar Azizzadenesheli et al.: "Sample-Efficient Deep AL with Generative Adversarial Tree Search," ARXIV.ORG, CORNELL UNIVERSITY LIBRARY, 201 OLIN LIBRARY CORNELL UNIVERSITY ITHACA, NY 14853, Jun. 15, 2018 (2018-06-15), describe a generative adversarial tree search (GATS) algorithm that is a data-efficient reinforcement learning (DRL) process.

Ted Xiao et al.: "Generative Adversarial Networks for Model Based Reinforcement Learning with Tree Search," Jan. 1, 2016 (2016-01-01), describe a generative adversarial network for learning a dynamic model that is then used for an online tree search. Also proposed is a model-based reinforcement learning framework that uses a combination of video prediction with GANs and online tree search methods.

Xinshi Chen et al.: "Generative Adversarial User Model for Reinforcement Learning Based Recommendation System," ARXIV.ORG, CORNELL UNIVERSITY LIBRARY, 201 OLIN LIBRARY CORNELL UNIVERSITY ITHACA, NY 14853, Dec. 27, 2018 (2018-12-27), describe a model-based reinforcement learning framework for recommendation systems in which a generative adversarial network is used to imitate the dynamic of the user behavior and to learn its reward function.

Nir Baram et al.: "End-to-End Differentiable Adversarial Imitation Learning," PROCEEDINGS OF MACHINE LEARNING RESEARCH, Vol. 70, Aug. 6, 2017 (2017-08-06), pp. 390-399, describe an improved generative adversarial imitation learning (MGAIL) algorithm.

Vaibhav Saxena et al.: "Dyna-AIL: Adversarial Imitation Learning by Planning", ARXIV.ORG, CORNELL UNIVERSITY LIBRARY, 201 OLINLIBRARY CORNELL UNIVERSITY ITHACA, NY 14853, Mar. 8, 2019, describe a continuously differentiable algorithm for adversarial imitative learning in a dyna-similar context, in order to switch between model-based planning and model-free learning from expert data.

It is desirable to further improve aspects of these procedures.

SUMMARY

This is achieved by way of the methods and apparatuses in accordance with example embodiments of the present invention. In accordance with an example embodiment of the present invention, a computer-implemented method for training a parametric model of an environment, in particular a deep neural network, provides that the model determines a new model state depending on a model state, on an action, and on a reward; the reward being determined depending on an expert trajectory and on a model trajectory determined in particular in accordance with a strategy depending on the model state; and at least one parameter of the model being determined depending on the reward. The result is that a long-term behavior of the model which is a particularly good match for a true system behavior of a modeled system is learned.

In accordance with an example embodiment of the present invention, provision is preferably made that a discriminator determines the reward depending on the expert trajectory and on the model trajectory; at least one parameter of the discriminator being determined with a gradient descent method depending on the expert trajectory and on the model trajectory. In a rollout, the expert trajectory is used as a reference; a generator, i.e., a specification device, determines in accordance with any strategy, depending on the model state, the model trajectory for comparison with the reference. The discriminator is parameterized with the gradient descent method. This enables parameterization of the discriminator in a first step independently of the training of the model.

The at least one parameter of the model is preferably learned, depending on the reward, with an episode-based policy search or a policy gradient method, in particular REINFORCE or TRPO. This allows the model to be trained in a second step independently of the training of the discriminator. Preferably, firstly the discriminator is trained and then the reward determined by the discriminator is used to train the model. These steps are preferably repeated alternatingly.

The reward is preferably determined depending on a true expected value for a system dynamic of the environment, and depending on a modeled expected value for the model. The expected values represent an approximation, based on the training data points, of the actual system dynamic; this makes possible more-efficient calculation of the training.

The expert trajectory is preferably determined in particular depending on a demonstration; an expert action, which specifies an expert in an environment state in particular in accordance with an expert strategy, being acquired; the environment being converted by the expert action, with a probability, into a new environment state; and the environment state, the expert action, and the new environment state being determined as a data point of the expert trajectory. Monitored learning can thereby be implemented particularly efficiently.

In accordance with an example embodiment of the present invention, preferably, the action that is specified depending on a strategy is acquired in a model state; the model being converted by the action, with a probability, into the new model state; the reward being determined depending on the model state, on the action, and on the new model state. This allows the discriminator to be trained with model trajectories that the generator determines depending on the model. The model changes during training. The model trajectories of the generator therefore change even if the strategy that the generator uses is unchanged. This allows the discriminator to be adapted to the changed model. Training thus becomes more effective overall.

In accordance with an example embodiment of the present invention, a parametric model of an environment that encompasses a controlled system is preferably trained depending on the controlled system; at least one state variable or manipulated variable for applying control to the controlled system being determined depending on the model and depending on at least one acquired actual variable or observed state variable of the controlled system. The model can be used in untrained or partly trained fashion depending on the controlled system. Conventional methods for open- or closed-loop control can thereby be significantly improved, especially in terms of learning the model.

Preferably an action is determined, in particular by way of an agent, depending on a model state of the model, in accordance with a strategy; a reward being determined depending on the strategy, on the action, or on a new model state; the strategy being learned, depending on the reward, in a reinforcement learning process. A strategy can thereby also be learned more efficiently. The purpose of the agent is to maximize the reward in the reinforcement learning process. The reward is determined, for example, depending on an indication of the conformity of the strategy with a specified reference strategy, or the conformity of a model behavior with an actual behavior of the environment or with a reference model behavior.

In accordance with an example embodiment of the present invention, a computer-implemented method for applying control to a robot provides that in accordance with the method set forth above, the parametric model of the environment is trained, the strategy is learned, and control is applied to the robot depending on the parametric model and on the strategy. This means that control is applied to a robot in such a way that it imitates a human behavior. The strategy for that is learned. To learn the strategy, the model, i.e. an environment model, which is also learned, is used.

In accordance with an example embodiment, an apparatus for applying control to a robot is embodied to execute the computer-implemented method for applying control to the robot. This apparatus is embodied to learn an environment model and a strategy with which human behavior can be imitated.

Further advantageous embodiments of the present invention are evident from the description below and from the figures.

DETAILED DESCRIPTION OF EXAMPLE EMBODIMENTS

Figure 1:
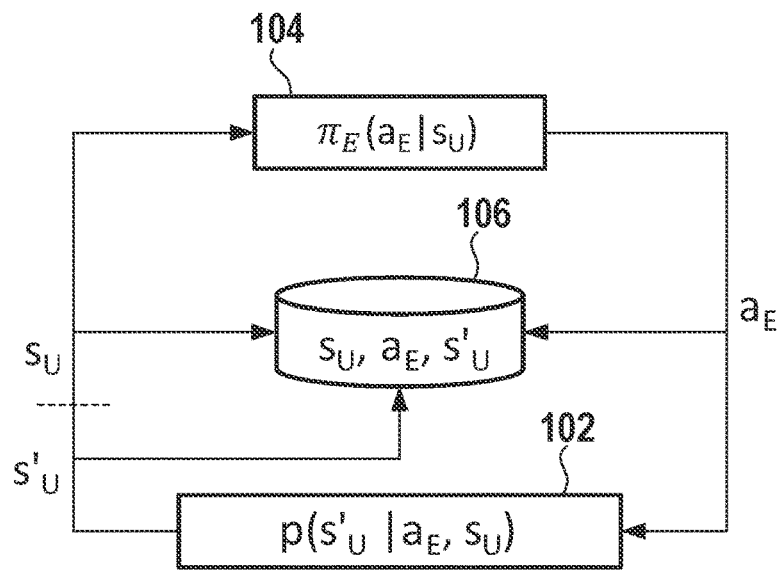
FIG. 1 schematically depicts a portion of an apparatus for applying control to a robot, in accordance with an example embodiment of the present invention.

FIG. 1 depicts a portion of an apparatus for applying control to a robot. The apparatus for applying control to the robot is embodied to train a parametric model of an environment in accordance with the method described below. The apparatus is embodied, as described below, to learn a strategy. In one aspect, the apparatus is furthermore embodied to train the model, as described below, depending on a controlled system. The apparatus is furthermore embodied to apply control to the robot depending on the parametric model and on the strategy. This apparatus is embodied to learn an environment model and a strategy with which human behavior can be imitated.

The apparatus for applying control to the robot encompasses at least one memory for instructions, and at least one processor for executing the instructions. Execution of the instructions results in a determination of an action for the robot depending on a strategy for applying control to the robot. The apparatus encompasses, for example, at least one control application device for applying control to the robot depending on the action.

The robot can be an at least partly autonomous vehicle that performs the action.

The apparatus is embodied to acquire an expert trajectory $\tau_E$ for an environment 102. Expert trajectory $\tau_E$ encompasses several triplets $(s_U, a_E, s'_U)$ that together yield expert trajectory $\tau_E=(s_{E0}, a_{E0}, s_{E1}, a_{E1}, \ldots, s_{ET})$. The apparatus encompasses a first specification device 104 that is embodied to determine, depending on an expert strategy $\pi_E(a_E|s_U)$, an expert action $a_E$ for an environment state $s_U$ of environment 102. Expert action $a_E$ causes environment 102 to be converted, with a probability $p(s'_U|a_E, s_U)$, into a new environment state $s'_U$. Specification device 104 can have a human-machine interface that is embodied to output state $s_U$ of environment 102 to an expert, and to acquire expert action $a_E$ depending on an input of the expert.

In the example, the apparatus is embodied to determine expert trajectory $\tau_E$ depending on a demonstration. During the demonstration, an expert action $a_E$ that specifies an expert in an environment state $s_U$ is acquired. Environment state $s_U$, expert action $a_E$, and new environment state $s'_U$ are determined as a data point of expert trajectory $\tau_E$. The apparatus is embodied, for example, to repeat these steps in order to acquire data points for expert trajectory $\tau_E$ until the demonstration has ended. In the example, a first memory 106 for expert trajectory $\tau_E$ is provided.

Figure 2:
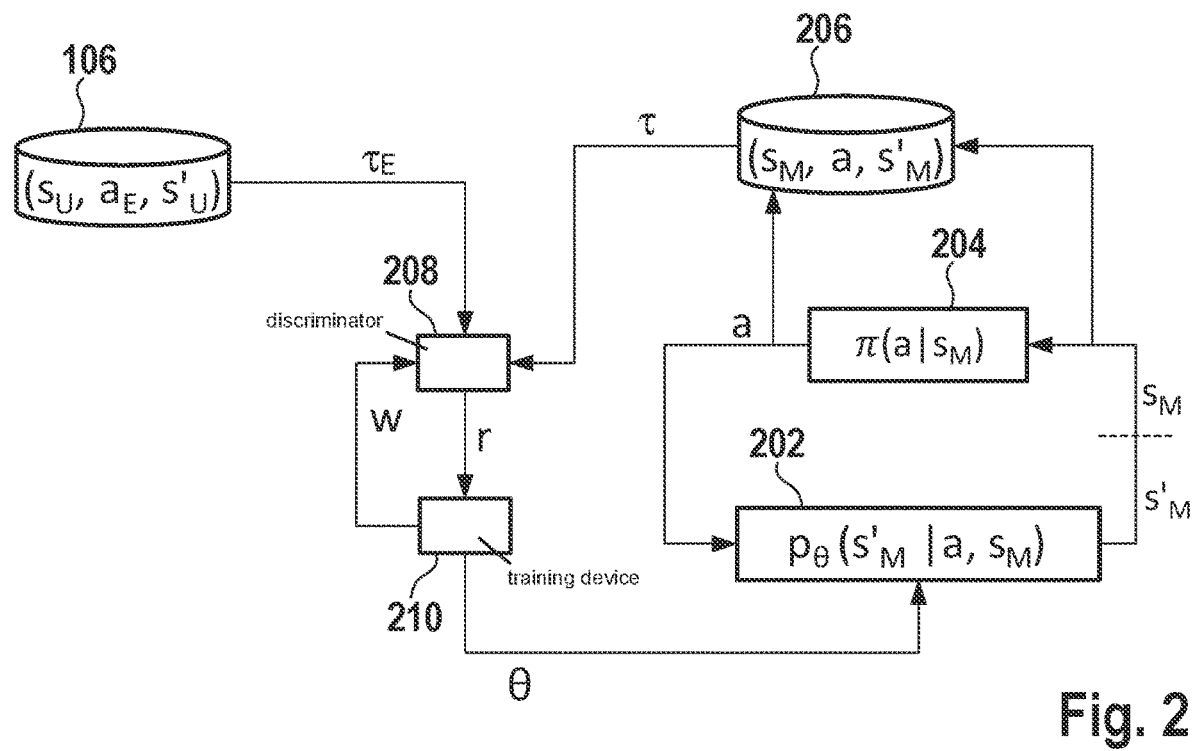
FIG. 2 schematically depicts a further portion of the apparatus, in accordance with an example embodiment of the present invention.

FIG. 2 schematically depicts a further portion of the apparatus. The apparatus is embodied to train a parametric model 202 of environment 102. Model 202 is, for example, a deep neural network. The apparatus encompasses a second specification device 204 for actions a. Model 202 is embodied to determine a new model state $s_M'$ depending on a model state $s_M$, on action a, and on a reward r. In the example, second specification device 204 is a generator that is embodied to determine action a in accordance with a strategy $\pi(a|s_M)$ depending on model state $s_M$.

Specification device 204 is embodied to acquire, during the training of model 202, a model trajectory T constituting a sequence of several $(s_M, a, s'_M)$ triplets that together yield model trajectory $T=(s_{M0}, a_{M0}, s_{M1}, a_{M1}, \ldots, s_{MT})$. The apparatus is embodied, for example, to repeat these steps in order to acquire data points for model trajectory $\tau$ until training of the model has ended. In the example, a second memory 206 for model trajectories $\tau$ is provided.

The apparatus encompasses a discriminator 208 that is embodied to determine reward r depending on an expert trajectory $\tau_E$ and on model trajectory $\tau$.

The apparatus encompasses a training device 210 that is embodied to determine at least one parameter w of discriminator 208, with a gradient descent method, depending on an expert trajectory $\tau_E$ and on model trajectory $\tau$.

Training device 210 is embodied to learn at least one parameter θ1 of model 202, depending on reward r, with an episode-based policy search or with a policy gradient method, in particular REINFORCE or TRPO.

Training device 210 is embodied to determine reward r depending on a true expected value $\mathbb{E}_p$ for a system dynamic of environment 102 and depending on a modeled expected value $\mathbb{E}_{p_\theta}$ for model 202. Training device 210 is embodied, for example, to acquire action a that is specified in a model state $s_M$; model 202 being converted into the new model state $s'_M$ by action a with a probability $p_\theta(s'_M|a,s_M)$; and reward r being determined depending on model state $s_M$, on action a, and on new model state $s'_M$. Training device 210 is embodied to determine the at least one parameter θ of model 202 depending on reward r.

Figure 3:
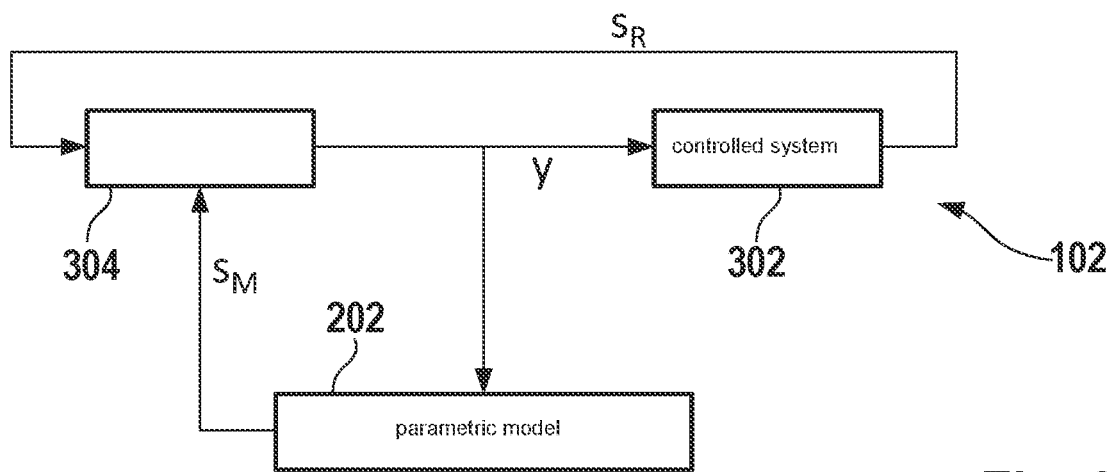
FIG. 3 schematically depicts parts of a closed-loop control system, in accordance with an example embodiment of the present invention.

In one aspect, a device for model-based open- or closed-loop control is also provided. FIG. 3 depicts a device for closed-loop control which encompasses a parametric model 202 of environment 102, environment 102 encompassing a controlled system 302. The device is embodied to train model 202 depending on controlled system 302. The device is embodied to determine, depending on model 202 and depending on at least one acquired actual variable $s_R$ or observed state variable of controlled system 302, at least one state variable or manipulated variable y for control application to controlled system 302. A corresponding procedure, not dependent on an actual variable, is used for open-loop control.

Figure 4:
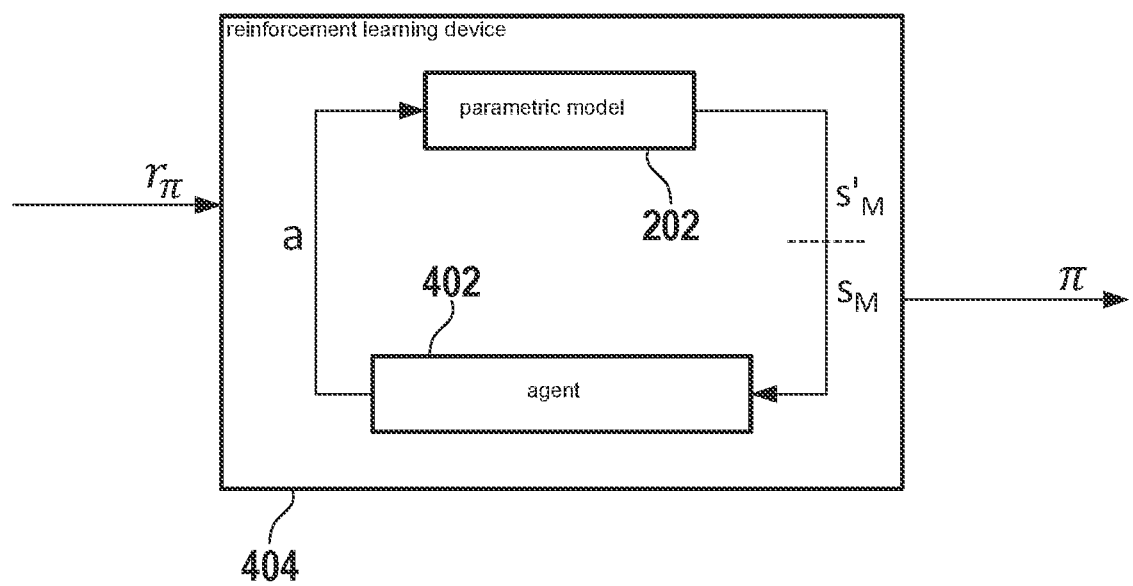
FIG. 4 schematically depicts parts of a learning system, in accordance with an example embodiment of the present invention.

A device for model-based learning of a strategy is schematically depicted in FIG. 4. This device encompasses parametric model 202 of environment 102. The device encompasses an agent 402 that is embodied to determine action a depending on model state $s_M$ of model 202 in accordance with strategy π. A reinforcement learning device 404 is embodied to determine a reward $r_\pi$ depending on strategy π, on action a, or on new model state $s'_M$, and to learn strategy π depending on reward $r_\pi$ in a reinforcement learning process.

Figure 5:
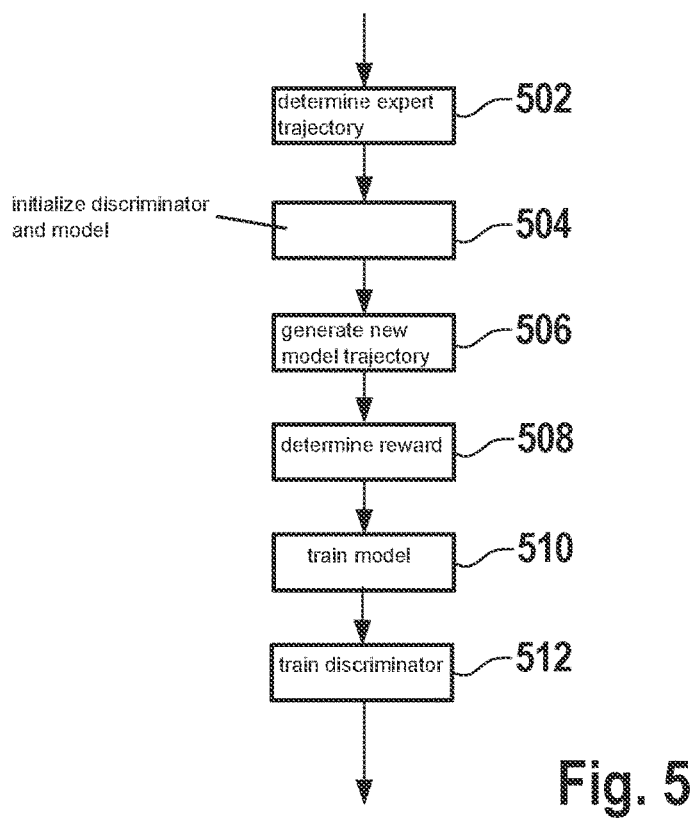
FIG. 5 shows steps in a method for training a model, in accordance with an example embodiment of the present invention.

FIG. 5 depicts steps of a computer-implemented method for training parametric model 202 of environment 102.

In a step 502, expert trajectory $\tau_E$ is determined in particular depending on a demonstration.

In the example, expert action $a_E$ that specifies the expert in an environmental state $s_U$ is acquired. Environment state $s_U$, expert action $a_E$, and new environment state $s'_U$ are determined, for example, as a data point of expert trajectory $\tau_E$. This step is repeated, for example, until the demonstration has ended.

A step 504 is then executed. In step 504, discriminator 208 and model 202 are initialized, for example using random values for the respective parameters.

A step 506 is then executed. In step 506, a new model trajectory is generated using the model parameters of model 202. For example, new model states $s_M'$ depending on the respective model state $s_M$, and respective actions a for model trajectory τ, are determined for model 202.

A step 508 is then executed. In step 508, reward r is determined depending on expert trajectory $\tau_E$ and on model trajectory τ. In the example, reward r is determined for the generated model trajectory τ. Discriminator 208 is used for this.

A step 510 is then executed. In step 510, model 202 is trained with the aid of reward r or with an accumulated reward R. In this context, at least one parameter θ of model 202 is learned, for example, with an episode-based policy search or with a policy gradient method, in particular REINFORCE or TRPO.

A step 512 is then executed. In step 512, discriminator 208 is trained with the aid of expert trajectories and model trajectories. In the example, at least one parameter w of discriminator 208 is determined with a gradient descent method, depending on expert trajectory $\tau_E$ and on model trajectory τ.

In the example, the steps are repeated. The accumulated reward R is determined from the rewards r that were determined for the various model trajectories.

The initially unknown reward r is determined proceeding from a Markov decision process M=(S, A, p, $r_\pi$, $\mu_0$, γ) from which it is assumed that the expert trajectories were created in the decision process M. The reward is, for example, a binary value, i.e. true or false. The purpose of the subsequent optimization is to learn a function $p_\theta \approx p$, where $p(s_U, a_E, s'_U)$ indicates the actual system behavior of the environment.

The Markov decision process below, with an unknown reward r, is used for this:

$$\tilde{M} = (\tilde{S}, \tilde{A}, \tilde{p}_{\pi_E}, \tilde{r}, \tilde{\mu}_0, \gamma)$$

where
action space $\tilde{A} = S$,
state space $\tilde{S} = \{(s,a), s \in S, a \in A\}$,
initial distribution $\tilde{\mu}_0(\tilde{s}_0) = \mu_0(s_0, a_0) = \mu_0(s_0)\pi_E(a_0|s_0)$
dynamic monitoring probability $$\begin{aligned}
\tilde{p}_{\pi_E} &= (\tilde{s}_{t+1}, \tilde{a}_t \mid \tilde{s}_t, \tilde{a}_t) \\
&= \tilde{p}_{\pi_E}((s'_{t+1}, a_{t+1}) \mid (s_t, a_t), s_{t+1}) \\
&= \tilde{p}_{\pi_E}((s'_{t+1}, \pi_E(a_{t+1}|s_{t+1})) \mid (s_t, a_t), s_{t+1}) \\
&= \begin{cases} \pi_E(a_{t+1}|s_{t+1}) & \text{for } s'_{t+1} = s_{t+1} \\ 0 & \text{otherwise} \end{cases}
\end{aligned}$$

If a GAIL method is used in this decision process, reward r is determinable and model $p_\theta$ is learnable.

Reward r is determined, for example, depending on a true expected value $\mathbb{E}_p$ for a system dynamic of environment 102 and depending on a modeled expected value $\mathbb{E}_{p_\theta}$ for model 202.

For the gradient descent method, for example, rollouts are provided using any strategy it, where $$\nabla_w [\mathbb{E}_p[\log(1-D_w(s_U,a,s_U'))] + \mathbb{E}_{p_\theta}[\log(D_w(s_M,a,s_M'))]]$$

where
$D_w$ = discriminator having at least one parameter w.

For example, log(D) is used as a reward r in order to train a model $p_\theta$, where $$\nabla_\theta \mathbb{E}_{p_\theta}[\log(D_w(s_M,a,s_{M'}))] \approx \hat{\mathbb{E}}_{\pi_i}[\nabla_\theta \log p_\theta(s_M,a,s_{M'}) Q(\hat{s}_M, \hat{a}, \hat{s}_{M'})]$$

where $$Q(\hat{s}_M, \hat{a}, \hat{s}_{M'}) = \hat{\mathbb{E}}_{\pi_i}[\log D_w(s_M,a,s_{M'}) | s_0 = \hat{s}_M, a_0 = \hat{a}, s_0' = \hat{s}_M']$$

where $\hat{\mathbb{E}}_{\pi_i}$ = expected value for the i-th model trajectory, proceeding from a model state $s_0$, an action $a_0$, and a new model state $s_0'$.

An exemplifying algorithm that is based on an episode-based policy search is indicated below as pseudocode. The algorithm proceeds from an expert trajectory $\tau_E$ that is determined by way of expert strategy $\pi_E$:

for i=1 to ... do
    Sample model parameters $\theta_i^{[j]} \sim \Pi_{\omega_i}$ from model parameter proposal distribution
    for each model parameter $\theta_i^{[j]}$ do
        Sample K trajectories $\tau_K \sim p_{\theta^{[j]}}$
        Evaluate model parameter $R^{[j]} = \Sigma_{t=1}^T r_t^{[j]}$ where $$r_t^{[j]} = \frac{1}{K}\sum_{k=1}^{K} D_{w_i}(s_t^{[k]}, a_t^{[k]}, s_{t+1}^{[k]}) + \lambda H^\gamma(p_{\theta_i^{[j]}})$$

end for
Update discriminator from $w_i$ to $w_{i+1}$ by maximizing $$\mathbb{E}_{p_\theta}[\log(D_{w_i}(s_M, a, s_{M'}))] + \mathbb{E}_p[\log(1 - D_{w_i}(s_U, a, s_{U'}))]$$

Update model parameter proposal distribution from $w_i$ to $w_{i+1}$ using weighted maximum likelihood with the weights $R^{[j]}$ end for.

The following definitions of R, r, γ and λ are used in the algorithm:
R total accumulated reward of a model trajectory made up of several (s,a,s') triplets,
r reward of a single (s,a,s') triplet which is determined via the discriminator,
H causal entropy of a model q
γ discount factor of an infinite horizon discounted MDP
λ freely selectable regularization factor.

Figure 6:
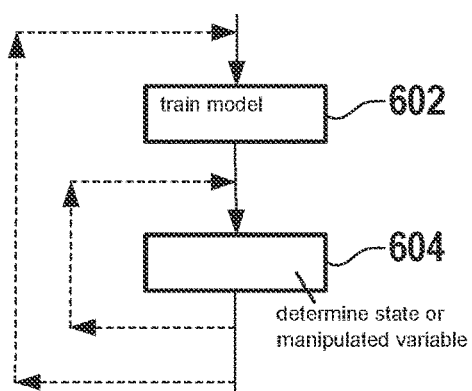
FIG. 6 shows steps in a closed-loop control system, in accordance with an example embodiment of the present invention.

FIG. 6 depicts steps in a method for model-based closed-loop control. Parametric model 202 of environment 102, which encompasses controlled system 302, is trained in a step 602, as described, depending on controlled system 302. In a step 604, the at least one state variable or manipulated variable y for application of control to controlled system 302 is then determined depending on model 202 and depending on the at least one acquired actual variable $s_R$ or observed state variable of controlled system 302. These steps can be recursively repeated after initialization of model 202, for example, for a self-learning controller. Provision can also be made to train the model first, and to repeat only step 604 for closed-loop control.

Figure 7:
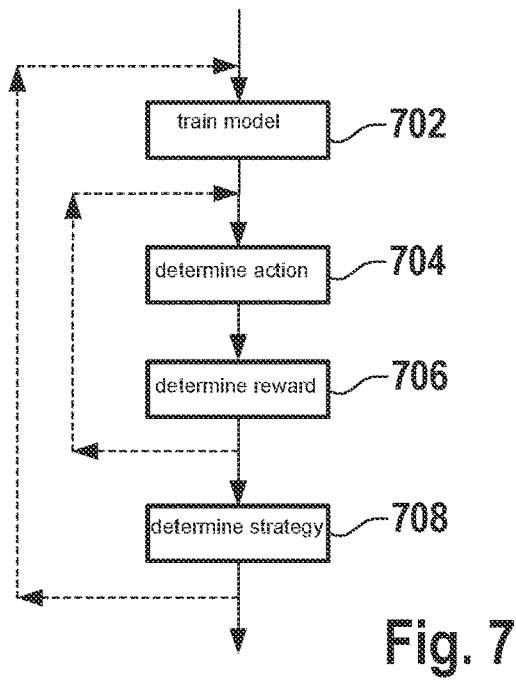
FIG. 7 shows steps in a learning process for a strategy, in accordance with an example embodiment of the present invention.

FIG. 7 depicts steps in a method for model-based learning of a strategy. In a step 702, parametric model 202 of environment 102 is trained as described.

In a subsequent step 704, action a is determined in particular by an agent 402 depending on model state $s_M$ of model 202, in accordance with strategy π.

In a step 706, a reward $r_\pi$ is then determined based on strategy π, on action a, or on new model state $s'_M$. In a step 708, strategy π is then determined depending on reward $r_\pi$ in a reinforcement learning process.

This reward $r_\pi$ is, for example, dependent on the task that is to be learned at the end of strategy π. The reward can be defined as a function r(s,a) or r(s). The result is to reward the degree to which an action a in a state s contributes to performance of the task, or how good it is at performing the task in a specific state.

If the task is, for example, navigating to a destination in a 2D environment that is modeled by model 202, the reward can then be, for example, the distance to the destination. A strategy for navigation for a vehicle can be correspondingly learned.

Steps 702 to 708 are preferably repeated recursively. Provision can be made to repeat steps 704 and 706 recursively before step 708 is executed.

A computer-implemented method for applying control to a robot is described below. The method provides that parametric model 202 of environment 102 is trained in accordance with the method described with reference to FIG. 5. The method further provides that strategy π be learned in accordance with the method described with reference to FIG. 7, and that control be applied to the robot depending on parametric model 202 and on strategy π. This means that control is applied to the robot in such a way that it imitates a human behavior.

In one aspect, model 202 is trained, in accordance with the method described with reference to FIG. 6, depending on the controlled system.

The invention claimed is:

1. A computer-implemented method for training a parametric model of an environment, the model being a deep neural network, the method comprising the following steps:
    providing the model, the model being configured to determine a new model state depending on a model state, on an action, and on at least one parameter of the model;
    determining an expert trajectory depending on a demonstration, wherein an expert action, which specifies an expert in an environment state in accordance with an expert strategy, is acquired, the environment is converted by the expert action, with a probability, into a new environment state, and the environment state, the expert action, and the new environment state are determined as a data point of the expert trajectory;
    wherein the parameter of the model is determined depending on a reward, the reward being determined depending on the expert trajectory and on a model trajectory determined in accordance with a strategy depending on the model state;
    wherein the model encompasses a controlled system, and is trained depending on the controlled system, at least one state variable or manipulated variable for applying control to the controlled system is determined depending on the model and depending on at least one acquired actual variable or observed state variable of the controlled system.

2. The method as recited in claim 1, wherein a discriminator determines the reward depending on the expert trajectory and on the model trajectory, and wherein at least one parameter of the discriminator is determined with a gradient descent method depending on the expert trajectory and on the model trajectory.

3. The method as recited in claim 1, wherein the at least one parameter of the model is learned, depending on the reward, with an episode-based policy search or with a policy gradient method.

4. The method as recited in claim 3, wherein the at least one parameter of the model is learned with REINFORCE or TRPO.

5. The method as recited in claim 1, wherein the reward is determined depending on a true expected value for a system dynamic of the environment and depending on a modeled expected value for the model.

6. The method as recited in claim 1, wherein the action specified depending on a strategy is acquired in the model state, the model is converted by the action, with a probability, into the new model state, the reward being determined depending on the model state, on the action, and on the new model state.

7. The method as recited in claim 1, wherein the action is determined using an agent, depending on the model state of the model, in accordance with the strategy, the reward being determined depending on the strategy, on the action, or on a new model state, the strategy being learned, depending on the reward, in a reinforcement learning process.

8. A computer-implemented method for applying control to a robot, the method comprising:
- training a parametric model of an environment, the model being a deep neural network, the training including:
  - providing the model, the model being configured to determine a new model state depending on a model state, on an action, and on at least one parameter of the model;
  - determining an expert trajectory depending on a demonstration, wherein an expert action, which specifies an expert in an environment state in accordance with an expert strategy, is acquired, the environment is converted by the expert action, with a probability, into a new environment state, and the environment state, the expert action, and the new environment state are determined as a data point of the expert trajectory;
  - wherein the parameter of the model is determined depending on a reward, the reward being determined depending on the expert trajectory and on a model trajectory determined in accordance with a strategy depending on the model state;
- learning the strategy for applying control to the robot; and
- applying control to the robot depending on the parametric model and on the strategy.

9. A non-transitory computer-readable memory on which is stored a computer program, including computer-readable instructions for training a parametric model of an environment, the model being a deep neural network, the instructions, when executed by a computer, causing the computer to perform the following steps:
- providing the model, the model being configured to determine a new model state depending on a model state, on an action, and on at least one parameter of the model;
- determining an expert trajectory depending on a demonstration, wherein an expert action, which specifies an expert in an environment state in accordance with an expert strategy, is acquired, the environment is converted by the expert action, with a probability, into a new environment state, and the environment state, the expert action, and the new environment state are determined as a data point of the expert trajectory;
- wherein the parameter of the model is determined depending on a reward, the reward being determined depending on the expert trajectory and on a model trajectory determined in accordance with a strategy depending on the model state;
- wherein the model encompasses a controlled system, and is trained depending on the controlled system, at least one state variable or manipulated variable for applying control to the controlled system is determined depending on the model and depending on at least one acquired actual variable or observed state variable of the controlled system.

10. An apparatus for applying control to a robot, the apparatus configured to:
- train a parametric model of an environment, the model being a deep neural network, the training including:
  - providing the model, the model being configured to determine a new model state depending on a model state, on an action, and on at least one parameter of the model;
  - determining an expert trajectory depending on a demonstration, wherein an expert action, which specifies an expert in an environment state in accordance with an expert strategy, is acquired, the environment is converted by the expert action, with a probability, into a new environment state, and the environment state, the expert action, and the new environment state are determined as a data point of the expert trajectory;
  - wherein the parameter of the model is determined depending on a reward, the reward being determined depending on the expert trajectory and on a model trajectory determined in accordance with a strategy depending on the model state;
- learn the strategy for applying control to the robot; and
- apply control to the robot depending on the parametric model and on the strategy.

* * * * *